May 7, 1940.  C. H. HAPGOOD  2,199,821
MILKING APPARATUS
Filed March 16, 1939  2 Sheets-Sheet 2
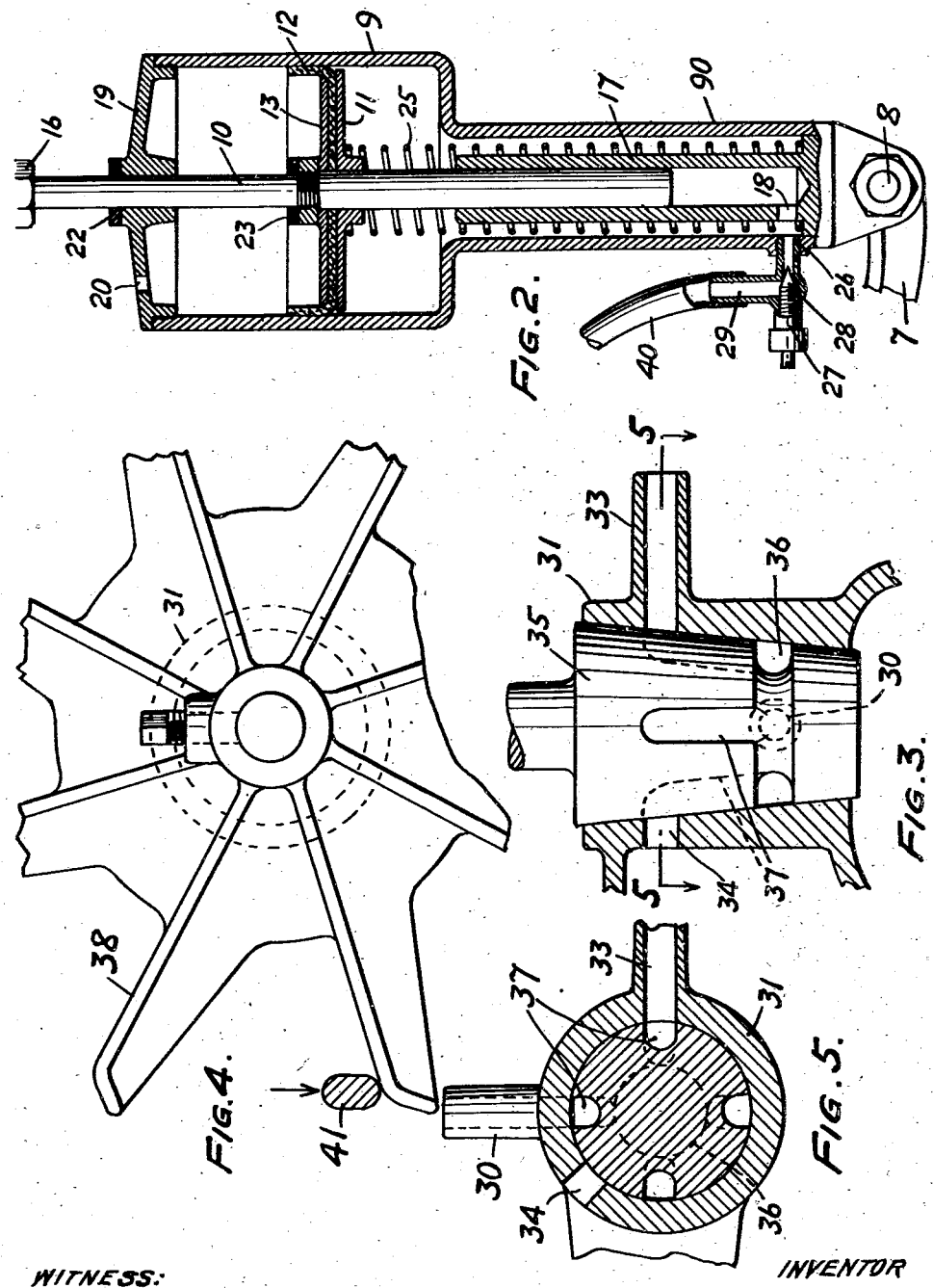
WITNESS:
Robt R Kitchel.
INVENTOR
Cyrus Howard Hapgood
BY
Busser and Harding
ATTORNEYS.

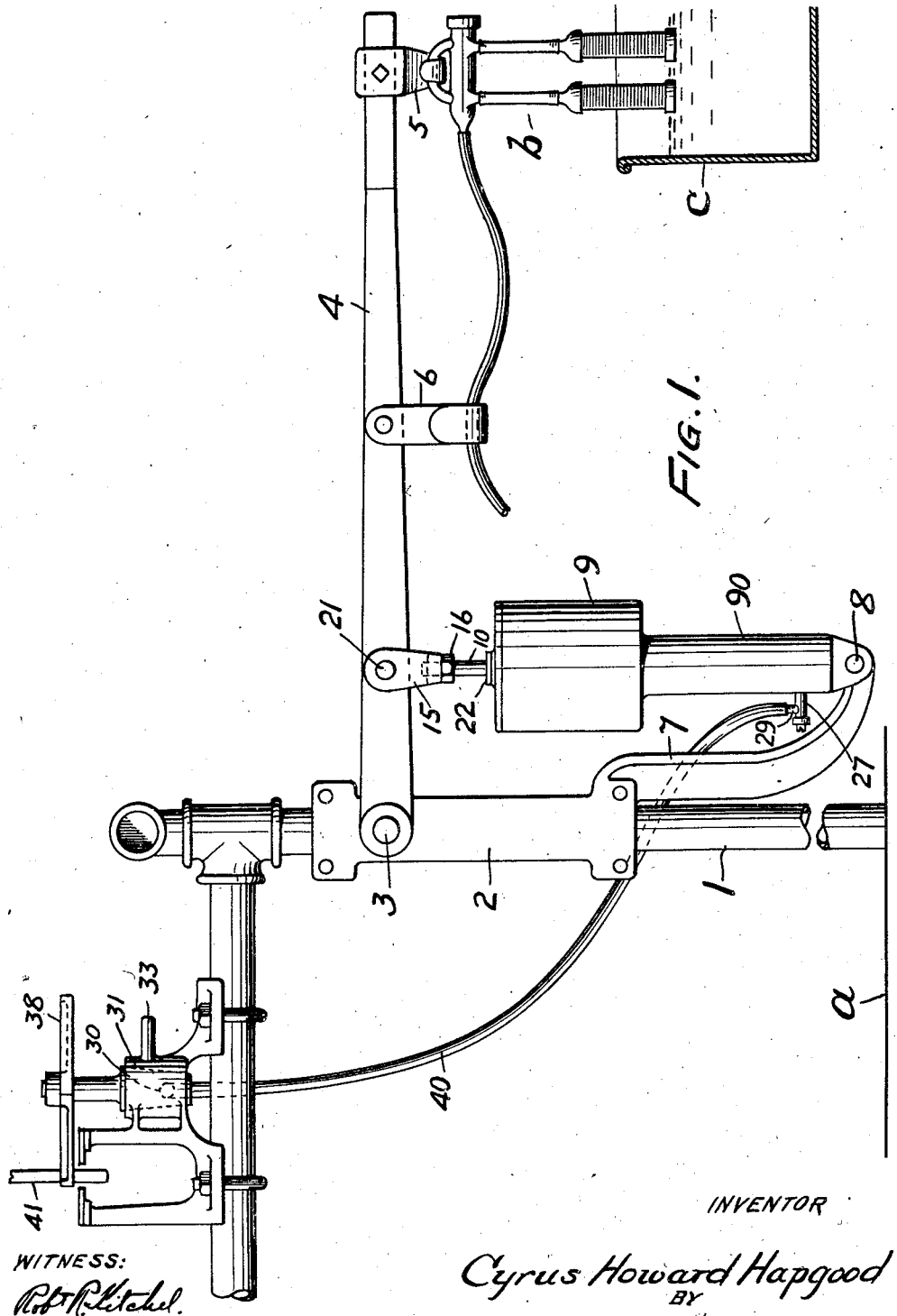

Patented May 7, 1940

2,199,821

UNITED STATES PATENT OFFICE 2,199,821

MILKING APPARATUS

Cyrus Howard Hapgood, Nutley, N. J., assignor to The De Laval Separator Company, New York, N. Y., a corporation of New Jersey Application March 16, 1939, Serial No. 262,142

7 Claims. (Cl. 31—58)

In Patents No. 1,787,152, dated December 30, 1930, No. 1,987,955, dated January 5, 1935, and No. 2,059,340, dated November 3, 1936, there is set forth a cow milking apparatus comprising a rotatable platform or table provided adjacent its periphery with radially extending stalls each adapted to receive a cow to be milked, milking machinery comprising a number of milking units adapted to be operatively connected with a corresponding number of cows, and means made effective by the movement of the platform to render the milking units successively operable.

Each milking unit of this apparatus comprises a milk pail, a hose connected with the pail, an air valve movable into position to connect the hose with either vacuum or pressure (conveniently the atmosphere), a set of double chambered teat cups, hose connections between the teat cups and the pail, and a milk valve in said hose connections adapted to be opened or closed, and other mechanism, not of interest in connection with the present invention, including means for producing pulsations in the outer chambers of the teat cups. During the milking operation the milk valve is open and the air valve connects the pail with vacuum, causing the milk to be drawn through the teat cups into the pail. At the conclusion of milking the milk valve is closed, the teat cups are removed from the cow and hung on a hook on the end of a lever, and the air valve is moved into position to connect the pail with atmosphere, allowing a gate on the pail (closed during milking by the pressure of the atmosphere) to discharge the milk into a weigh tank.

Thereafter the lever carrying the teat cups is swung on its pivot to drop the teat cups into a cold water tank. The air valve is moved to connect the pail with vacuum and the milk valve on the hose connections between the teat cups and pail is opened, the vacuum then drawing cold water through the teat cups into the pail. The milk valve is then closed and then the air valve is moved to connect the milk pail with atmosphere, causing the cold water to be dumped into a gutter surrounding the rotary platform. The lever carrying the teat cups is swung to lift the teat cups out of the cold water tank.

A hot water tank is also provided and the milking unit is flushed out with hot water in the same way as it was flushed out with cold water.

The actuation of the valves (except in one instance) is automatic. So also is the actuation of the lever carrying the teat cups. The actuation of this lever is effected by means of stationary cam tracks, with which, in the rotation of the platform, a roller on the lever contacts. This cam track extends along each wash tank and slightly beyond both ends of the same. The teat cups are normally in their lower position and are raised as they approach a tank and are then lowered into the tank and then are raised out of the tank.

Cooperating with the teat cup carrier are the vacuum, air and milk valves which are automatically operated by the rotation of the table, as fully described in said patents and particularly in Patent No. 1,787,152.

In the operation of the commercial structure embodying the inventions the peripheral speed of the table is about 15 feet per minute. At this speed the time required to lift the teat cups from the low position to the high position is comparatively short, as the cams are made with inclines as steep as practicable.

In a more recent structure, intended primarily for exhibition purposes, the peripheral speed of the table has been reduced to five feet per minute. By reason of the fact that the steepness of the cam cannot be practically increased, the time required to lift the teat cups is increased three fold. This is found to be impractically slow, since during the raising of the teat cups out of the water and their lowering into the water, the cups are out of the water a sufficient time to break the vacuum of the whole system. The raising of the teat cups several times from the wash water has been found advantageous, as the admission of air to the teat cups for a short period greatly increases the velocity of the wash water, resulting in better washing.

The object of the present invention is to obviate the described difficulty and this I accomplished by providing a spring to raise the teat cups and keep them in the upper position and utilize the vacuum of the system to pull the teat cups to the lower position and hold them in such position.

A preferred embodiment of the invention is shown in the accompanying drawings in which—

Fig. 1 is an elevational view of the entire apparatus.

Fig. 2 is an enlarged vertical sectional view of the cylinder and piston actuating the teat cup carrier.

Fig. 3 is a longitudinal sectional view of the valve that controls the connection of the cylinder alternately with the atmosphere and vacuum.

Fig. 4 is a partial view of the star wheel, attached to said valve, which is actuated to intermittently turn said valve.

Fig. 5 is a cross-section on the line 5—5 of Fig. 3.

The stalls are formed by spaced apart posts 1, secured to the outer edge of the rotary table and radially extending bars (not shown). One of the posts is shown in Fig. 1. From each post is carried mechanism comprising a set of teat cups for one of the stalls adjacent such post and means for raising and lowering such teat cups, the operation of each of said mechanisms being controlled by an actuator common to all the mechanisms for operating successively the series of sets of teat cups located in the series of stalls. To each post 1 is secured a bracket 2 which carries a stud 3, upon which one end of a lever 4 is pivotally mounted. Near the other end lever 4 carries a hook 5, on which the teat cup cluster $b$ is hung. Hook 5 is adjustable along the lever 4 in order that the teat cups may be brought, in the rotation of the table, directly over the center of the wash water tank $c$. Lever 4 also carries a hook 6, which holds the three rubber tubes connected with the teat cup cluster and udder pulsator shown in Figure 2 of Patent No. 1,787,152.

Bracket 2, secured as aforesaid to post 1, has an arm 7, at the lower end of which is a pin 8 about which is rotatable a vacuum cylinder comprising a lower part 90 of relatively small diameter and an upper part 9 of relatively large diameter. In this cylinder is a piston rod 10 which is guided at the bottom by a sleeve 17 and at the top by a bearing in a cap 19 which is threaded into the top of the cylinder.

Secured to piston rod 10 are a plate 11, a cup leather 12 and a plate 13, together forming a piston in the upper expanded section 9 of the cylinder.

Piston 10 is connected to lever 4 through the medium of a yoke which has a pin 21 having a bearing in the lever. The piston is threaded in the yoke and is held rigid relative thereto by means of a lock nut 16.

Surrounding piston rod 10 are rubber bumpers 22 and 23, which limit the downward and upward movements respectively of the piston.

In the annular space between the sleeve 17 and the contracted lower section 90 of the cylinder wall and extending up and confined against plate 11 is a spring 25. The lower end of the spring rests on a flange on the sleeve 17.

Near its lower end the cylinder is provided with an opening 26, which is adapted for alternate connection with the atmosphere and with a partial vacuum as hereinafter described. The sleeve 17 is vented near its lower end at 18. The cap 19 of the cylinder is provided with a vent 20, so that the cylinder above the piston is in constant communication with the atmosphere.

Into the opening 26 is secured a needle valve body 27 having a nipple 29. Within the valve body 27 is threaded a needle valve 28 which is adjusted to regulate the air flow between the nipple 29 and the cylinder 9—90. Nipple 29 is connected, by means of a rubber tube 40, with a nipple 30 of a valve body 31, which is also provided with a nipple 33 connected, by means not shown, with the vacuum system and with an air port 34 which is in the same plane as the opening to the nipple 33.

A valve plug 35 fits in the valve body 31 and has a recess 36, in the same plane as nipple 30, which communicates with four grooves 37, ninety degrees apart, formed in the valve plug 35 and leading up to the plane of ports 33 and 34.

To the stem of valve plug 35 is secured a star wheel 38. In the rotation of the table stationary actuators 41 are successively engaged by the star wheel, which is thereby turned, by each actuator, through an arc of 45°. At successive fractional turns of the wheel 38 and valve plug 35, a groove 37 is brought into registry with one of the ports 33 or 34 and next another groove 37 registers with the other of ports 33 and 34. Thus, recess 36 and nipple 30 (which are in constant communication) are alternatively connected with atmosphere and vacuum, thereby through tube 40, nipple 29, needle valve chamber 27, and opening 26, connecting the cylinder section 90 alternatively with pressure and vacuum. When cylinder section 90 is in communication with the atmosphere, the pressure on opposite sides of the piston is balanced and the spring moves the piston up (thereby swinging up the lever 4 and lifting the teat cups) until bumper 23 contacts with the boss of the cap 19.

By thus utilizing the vacuum system to control the movement of the teat cups into and out of the water tank, the objections to direct mechanical actuation of the lever carrying the teat cups are overcome.

It will be understood that while in practice the alternations of pressure are produced by atmospheric pressure and a lower pressure equivalent to a vacuum of fifteen inches, it is only necessary to operativeness that the described operation should be effected by any equivalent means of producing a workable different in pneumatic pressures.

What I claim and desire to protect by Letters Patent is:

1. In a cow milking machine comprising a rotatable platform adapted to carry cows to be successively milked, a stationary washing tank and a teat cup carrier carried by the platform and movable preparatory and subsequent to the teat cup washing operation, the combination, with a cylinder carried by the platform and a piston in the cylinder connected with and adapted to actuate the teat cup carrier, of means to move the piston in opposite directions at intervals to thereby raise the teat cup carrier and hold it in its upper position and alternately therewith lower the teat cup carrier and hold it in its lower position, said means comprising mechanism adapted to effect the connection of the cylinder on one side of the piston alternately with the atmosphere and with vacuum, and actuators engageable by said mechanism in the rotation of the platform and adapted to actuate said mechanism.

2. In a cow milking machine comprising a rotatable platform adapted to carry cows to be successively milked, a stationary washing tank and a teat cup carrier carried by the platform and movable preparatory and subsequent to the teat cup washing operation, the combination, with a cylinder carried by the platform and a piston in the cylinder connected with and adapted to actuate the teat cup carrier, of a spring engaging the piston and tending to raise the teat cup carrier, one end of the cylinder being vented to the atmosphere, mechanism adapted to connect the other end of the cylinder alternately with the atmosphere and with vacuum, whereby when both ends of the cylinder are under atmospheric pressure the spring will be effective to raise the teat cup carrier and whereby when one end of the cylinder is connected with a source of vacuum the unbalanced pressure on the piston will overcome the tension of the spring and lower the teat cup carrier, and actuators engageable by said mechanism in the rotation of the platform and adapted to thereby actuate said mechanism.

3. A cow milking machine in accordance with claim 2 in which said cylinder comprises a contracted lower end which is alternately connectable with the atmosphere and with vacuum as specified and an expanded upper end in which said piston is movable and which above the piston is vented to the atmosphere as specified, the spring being coiled around the piston rod and bearing at its lower end on the lower part of the contracted lower end of the cylinder and at its upper end on the piston.

4. A cow milking machine in accordance with claim 2 in which said mechanism comprises an air conduit connected with the second named end of the cylinder, a needle valve in said conduit, a valve turnable to connect said conduit alternately with the atmosphere and with vacuum, a wheel carried by the valve, and actuators engageable by said wheel in the rotation of the platform and adapted to actuate said wheel to turn said valve.

5. A cow milking machine in accordance with claim 2 in which said mechanism comprises an air conduit connected with the second named end of the cylinder, a valve body having a port connected with said conduit and provided with a vacuum port and a port communicating with the atmosphere, a valve turnable in said valve body into a number of successive positions adapted to connect said conduit alternately with the atmospheric port and the vacuum port, and actuators adapted, in the rotation of the platform, to turn said valve into its successive positions.

6. A cow milking machine in accordance with claim 2 in which said mechanism comprises an air conduit connected with the second named end of the cylinder, a valve body having a port connected with said conduit and provided with a vacuum port and a port communicating with the atmosphere, a valve turnable in said valve body into a number of successive positions and provided with a recess in constant communication with the port connected with said conduit and with grooves adapted, in the successive positions of the valve, to connect said recess alternately with the vacuum port and the atmospheric port, and actuators adapted in the rotation of the platform to turn said valve into its successive positions.

7. A cow milking machine in accordance with claim 2 in which said mechanism comprises an air conduit connected at one end with the second named end of the cylinder, a needle valve interposed in said conduit to regulate flow of air therethrough, a valve body having a port connected with the other end of said conduit, a valve in said valve body turnable to successive positions to thereby connect said conduit alternately with the atmosphere and with vacuum, and actuators adapted, in the rotation of the platform, to turn said valve into said successive positions.

CYRUS HOWARD HAPGOOD.